Aug. 19, 1952     C. H. BETTMAN     2,607,691
PRODUCTION OF SUGAR-COATED PROCESSED CEREALS
Filed Aug. 28, 1947
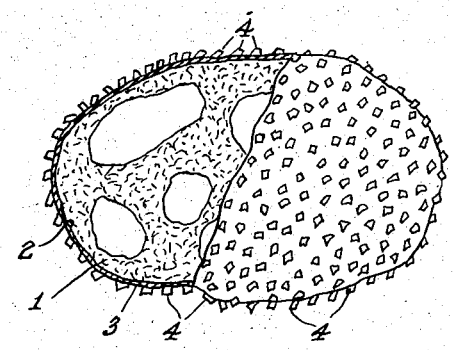
INVENTOR.
CARL HUGO BETTMAN
BY
ATTORNEY Patented Aug. 19, 1952

2,607,691

UNITED STATES PATENT OFFICE 2,607,691

PRODUCTION OF SUGAR-COATED PROCESSED CEREALS

Carl Hugo Bettman, Cedarhurst, N. Y.

Application August 28, 1947, Serial No. 771,080

1 Claim. (Cl. 99—83)

The invention relates to the production of edible products, more especially such as are derived from processed cereals or other farinaceous products, for example, pop corn, puffed oats, puffed rice, puffed wheat, puffed corn, etc.

I am aware that it has been attempted to candy-coat puffed cereal grains by providing a hardened, thin sugary film thereover, having a honey flavor, in a particular manner which gives rise to a separation of the individual cereal grains immediately subsequent to the coating operation, the latter being conducted under critical conditions and with a specific sugar composition including hardening agents.

The present invention has for an object to utilize only sugar in the preparation of the product and to combine it with puffed or otherwise processed like food products in a simple manner such that not only will the gustatory qualities of the original material be improved thereby but the keeping qualities of the grain material will also be enhanced, more especially as against moisture and weevil development.

Another object of the invention is to incorporate with food products of this nature sugar not only as an amorphous coating but also as discrete particles or crystals scattered profusely over the surface coating of the individual grain particles and integrated therewith.

Still another object of the invention is to provide a sugar-coated cereal product wherein the individual grains of the cereal are prevented from adhering to one another.

A further object of the invention is to provide a novel method for coating processed cereal grains and like material with pure sugar, such as cane or beet sugar, by applying the same thereto not only as an adherent coating for the respective surfaces of the individual grains but also as discrete sugar particles or crystals retained by the coating.

In carrying out the invention, an aqueous sugar syrup is prepared of a viscosity such that the sugar approaches the stage of incipient crystallization. There is then to be added to this syrup the cereal or other material with suitable agitation of the mixture and the application of heat which are continued until all moisture is expelled and the mixture becomes then sufficiently softened and the surfaces properly coated. Thereupon the heating is discontinued and granular or "sanding" sugar is added with continuation of the agitation only, this added sugar not only preventing final coalescing of the particles into a compact mass but, due to the rapid embrittlement of the sugar, serves to effect the desired separation of the individual grains from one another. The mass may then be removed and allowed to cool to room temperature, and any surplus sugar removed.

The nature of the invention, however, will best be understood when described in connection with the accompanying drawing which is a view on a greatly enlarged scale, in perspective and partly in section, of an individual puffed cereal grain having its surface coated with sugar and discrete sugar crystals integrated with the coating.

Referring to the drawing, the puffed or otherwise processed grains of cereal such as corn, wheat, rice, etc., are indicated by a grain 1, having the irregular surface or shell 2. Such puffed or otherwise processed grains are of an extremely porous nature and readily soluble in water, the shell 2 being weak and readily permeable by water or aqueous solutions, causing a grain to disintegrate rapidly in boiling liquids. Instead of using a so-called "puffed" grain of cereal and the like, cereals in granular form or flaked form (unless too brittle) may also be treated in the manner hereafter set forth.

In accordance with the invention, an aqueous sugar solution, or rather syrup, is prepared in well known manner including, for example, heating and agitation in the customary apparatus such as a revolving pan or kettle mixer (not shown). This syrup is boiled down until it attains a viscosity approaching the stage of incipient crystallization and is then suitable to receive the cereal grains, the same being added thereto under continued application of heat and agitation of the mixture until the syrup is wholly absorbed by the cereal material and water has been substantially removed therefrom. The amount of cereal to be added may be on a basis of 3 lbs. of the latter for each 2 lbs. of sugar in the syrup.

Continued heating and agitation serve to soften the entire mixture, whereupon the heating is discontinued and granular or so-called "sanding" sugar is added to the viscous mass. The amount of such additional sugar is to be ample to cover adequately the surfaces of the cereal grains and to effect the hardening of the entire sugar content of the mixture. Any surplus sugar is to be screened off. After the addition of said "sanding" sugar, the mass is removed for cooling, and it will be found as the cooling progresses that, due to the rapid embrittling of the syrup as a result of the added sugar, each particle will have a thin, firmly adherent coating 3 provided over its entire surface, which coating closes the pores of a grain and renders it impervious to the usual deteriorating agents. Moreover, there will be studded over the entire surface and integrated therewith, by being embedded in part in the said coating, crystals 4 of sugar which not only enhance the appearance of the product but provide the desired sugar content for consumption of the material as a food. Also, the preservative property of the sugar permits of storage of the novel product for extremely long periods of time without deterioration and the crystals keep the individual grains from adhering to one another.

I claim:

The method of preparing sugar-coated, edible grains of puffed cereal which comprises preparing a sugar syrup by dissolving sugar in water and heating and agitating the solution to cause it to acquire a degree of viscosity approaching a state of incipient crystallization, adding to said solution the grains of cereal with agitation thereof and the application of heat to the mixture to coat the individual grains, to expel substantially all of the water from the mixture and subsequently to soften said mixture, adding granular sugar thereto in an amount to cover adequately the surfaces of the respective grains to disintegrate the mass of grains and to integrate the added crystals of sugar with the surface coatings of respective grains, and cooling and removing the separated grains.

CARL HUGO BETTMAN.

REFERENCES CITED

The following references are of record in the file of this patent:

UNITED STATES PATENTS

| Number | Name | Date |
|---|---|---|
| 152,019 | Smith | June 16, 1874 |
| 1,025,326 | Speck | May 7, 1912 |
| 1,175,407 | Bright | Mar. 14, 1916 |
| 2,093,260 | Wilder | Sept. 14, 1937 |
| 2,181,109 | Dodge | Nov. 21, 1939 |
| 2,196,395 | Kellogg | Apr. 9, 1940 |

FOREIGN PATENTS

| Number | Country | Date |
|---|---|---|
| 22,177 | Great Britain | of 1908 |

OTHER REFERENCES

Chenowith, "How to Make Candy," MacMillan, 1936, pages 61, 153, 154, and 155.